(12) United States Patent
Kienitz et al.

(10) Patent No.: US 6,234,669 B1
(45) Date of Patent: May 22, 2001

(54) DEVICE FOR MEASURING TEMPERATURE WITHOUT CONTACT

(75) Inventors: Ulrich Kienitz; Volker Schmidt; Uwe Klonowski, all of Berlin (DE)

(73) Assignee: Raytek GmbH, Berlin (DE)

( * ) Notice: Subject to any disclaimer, the term of this patent is extended or adjusted under 35 U.S.C. 154(b) by 0 days.

(21) Appl. No.: 09/125,614

(22) PCT Filed: Dec. 23, 1997

(86) PCT No.: PCT/EP97/07259

§ 371 Date: Aug. 21, 1998

§ 102(e) Date: Aug. 21, 1998

(87) PCT Pub. No.: WO98/28601

PCT Pub. Date: Jul. 2, 1998

(30) Foreign Application Priority Data

Dec. 24, 1996 (DE) .............................. 196 54 276

(51) Int. Cl.[7] .................. G01K 1/00; G01J 5/02; G01B 11/00
(52) U.S. Cl. ................. 374/130; 374/121; 33/DIG. 21; 362/259; 356/399
(58) Field of Search ................... 374/161, 131, 374/130, 120; 356/43, 44, 45, 347, 375, 376, 399; 372/101, 103; 33/DIG. 21; 362/259

(56) References Cited

U.S. PATENT DOCUMENTS

| | | | |
|---|---|---|---|
| 3,606,541 | * 9/1971 | Suganu et al. | 356/376 |
| 3,670,260 | * 6/1972 | Koester et al. | 372/9 |
| 4,315,150 | * 2/1982 | Darringer et al. | 250/338.1 |
| 4,494,881 | * 1/1985 | Everest | 374/124 |
| 4,677,629 | * 6/1987 | Lesh | 372/18 |
| 5,524,984 | * 6/1996 | Hollander et al. | 374/121 |
| 5,626,424 | * 5/1997 | Litvin et al. | 374/121 |
| 5,727,880 | * 3/1998 | Hollander et al. | 374/121 |
| 5,803,606 | * 9/1998 | Petry et al. | 374/45 |
| 5,823,678 | * 10/1998 | Hollander et al. | 374/121 |
| 5,836,694 | * 11/1998 | Nguyen | 374/130 |

FOREIGN PATENT DOCUMENTS

| | | | |
|---|---|---|---|
| 2203537 | * 10/1988 | (GB) | 374/120 |
| 0044134 | * 2/1988 | (JP) | 374/120 |

* cited by examiner

Primary Examiner—Diego Gutierrez
Assistant Examiner—Lydia De Jesus
(74) Attorney, Agent, or Firm—Townsend and Townsend and Crew LLP

(57) ABSTRACT

Device for contactless temperature measurement of an object with an optical system which images into the finite and a detector, wherein an image of the detector is imaged by the optical system along an optical axis onto a measurement spot on the object in such a way that the image of the detector reduces from the optical system to a sharp point measurement spot and then enlarges, and also with a sighting arrangement which identifies the outer limit of the measurement spot by means of visible sighting rays. Each sighting ray is aligned obliquely with respect to the optical axis in such a way that each sighting ray can be used both before and also after the sharp point measurement spot to identify the measurement spot.

4 Claims, 5 Drawing Sheets

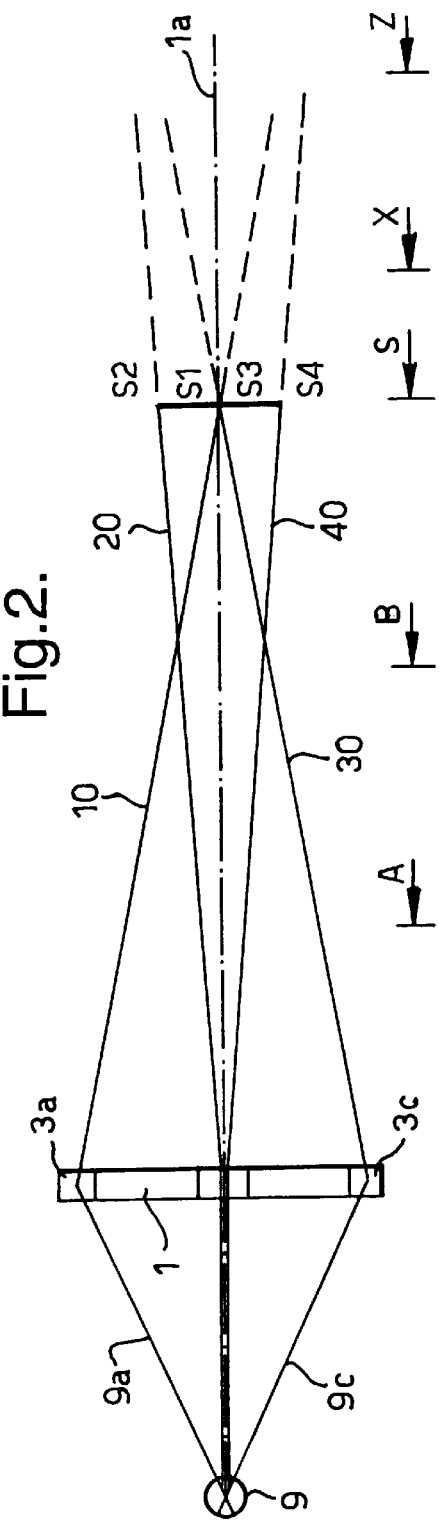
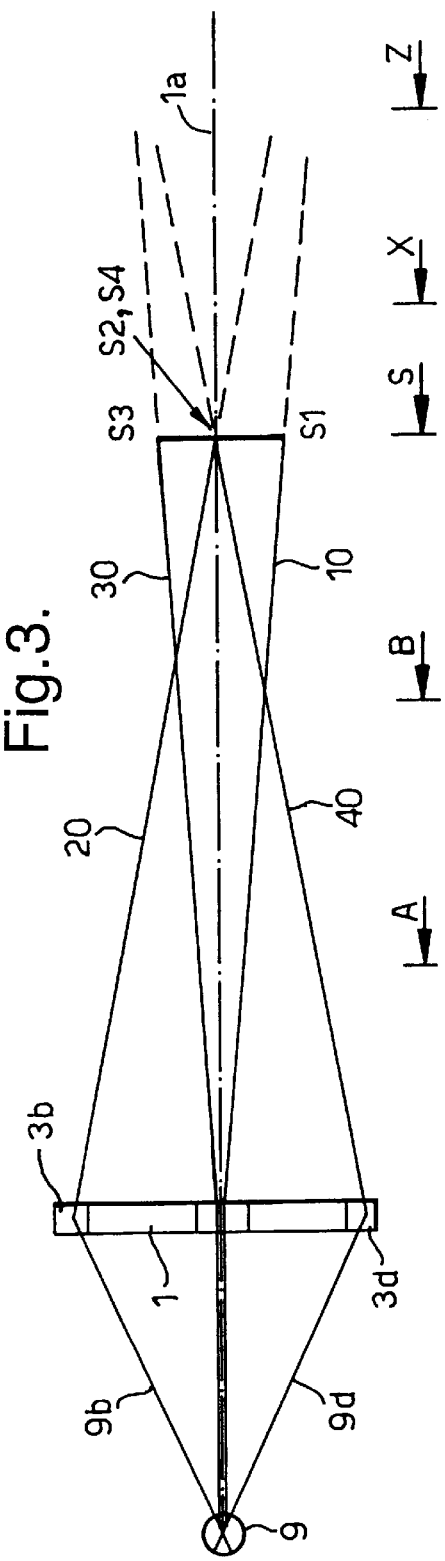

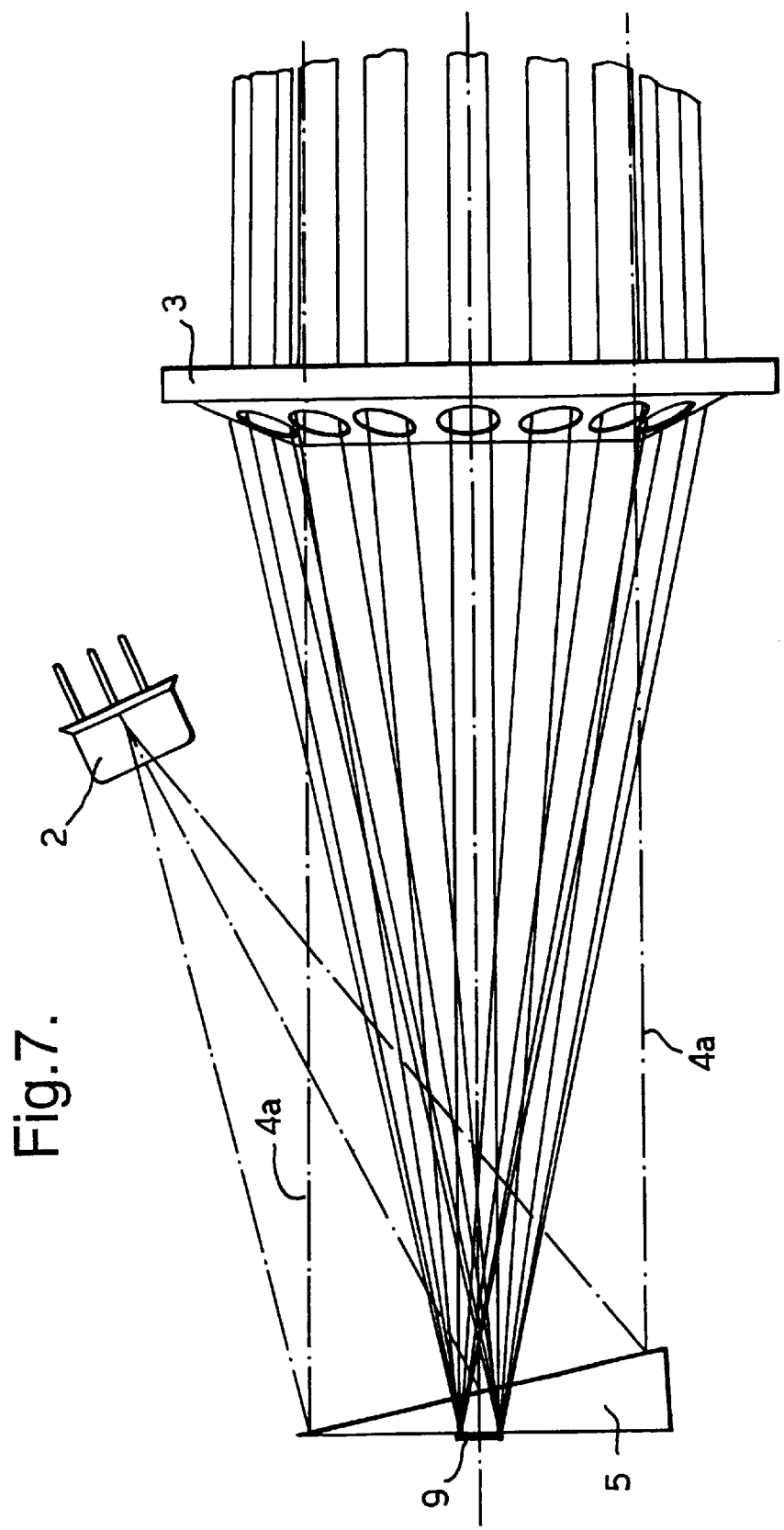

DEVICE FOR MEASURING TEMPERATURE WITHOUT CONTACT

BACKGROUND OF THE INVENTION

The invention relates to a device for contactless temperature measurement of an object with an optical system which images into the finite and a detector. In contactless temperature measurement it is indispensable in practical use that the measurement spot on the object to be examined should be rendered visible in a suitable way. U.S. Pat. No. 5,368,392 proposes the deflection of a laser beam onto a rotating deflecting mirror to draw a circle representing the measurement spot on the object. However, this sighting arrangement can only used in an optical system which images into infinity. In an optical system which images into the finite according, an image of the detector is reduced and then enlarged by the optical system along an optical axis onto a measurement spot on the object from the optical system to the so-called sharp point measurement spot. In the past, in order to identify the measurement spot in an optical system which images into the finite, an opening laser cone according to U.S. Pat. No. 5,368,392 was used for example, which has its origin in the optical system on the optical axis and intersects the actual beam path of the optical system once before and once after the sharp point measurement spot. Thus, apart from the two planes of intersection, the sighting spot thus produced merely constitutes an approximate representation of the actual measurement spot.

Another possibility consists of directing individual sighting rays from the outer periphery of the optical system onto the point of intersection of the optical axis and the sharp point measurement spot. The resulting sighting measurement spot reduces to 0 up to the sharp point measurement spot and then enlarges again. This solution also only shows the approximate size of the measurement spot.

In order to reproduce a more precise course of the beam path of the optical system it has also been proposed to provide a beam for the region between the optical system and the sharp point measurement spot and a further beam for the region thereafter. However, this means that in each case two sighting measurement spots of differing size, caused by the two sighting beams, are visible both before and after the sharp point measurement spot. This in turn means on the one hand that the allocation of the correct sighting beam presents difficulties in certain circumstances and on the other hand the light energy necessary for producing the sighting light must be divided over the two beams. Accordingly the intensity of the sighting measurement spot is also correspondingly lower.

SUMMARY OF THE INVENTION

The object of the invention, therefore, is to create a device for contactless temperature measurement which is simple to manipulate and in which the sighting spot corresponds substantially to the actual measurement spot.

This object is achieved according to the invention, in that each sighting ray is aligned obliquely with respect to the optical axis in such a way that the sighting ray can be used both before and also after the sharp point measurement spot to identify the measurement spot.

Both before and after the sharp point measurement spot the sighting rays merely delimit on the object to be examined a sighting spot which reduces up to the sharp point measurement spot and then enlarges again. By virtue of an alignment of the sighting rays which is adapted to the imaging optical system, the sighting spot which is represented corresponds substantially to the actual measurement spot both before and behind the sharp point measurement spot. The manipulation of the device is therefore conceivably simple, since only one sighting spot which corresponds substantially to the actual measurement spot is rendered visible on the object.

Further advantages and embodiments of the invention are the subject matter of the subordinate claims and are explained in greater detail with reference to the following description and the drawings.

BRIEF DESCRIPTION OF THE DRAWINGS

FIG. 2 shows a schematic representation of the sighting rays in a side view, FIG. 3 shows a schematic representation of the sighting rays according to FIG. 2 in a top view, FIG. 7 shows a representation of a device according to the invent ion.

DETAILED DESCRIPTION OF THE PREFERRED EMBODIMENTS

Figure 1:
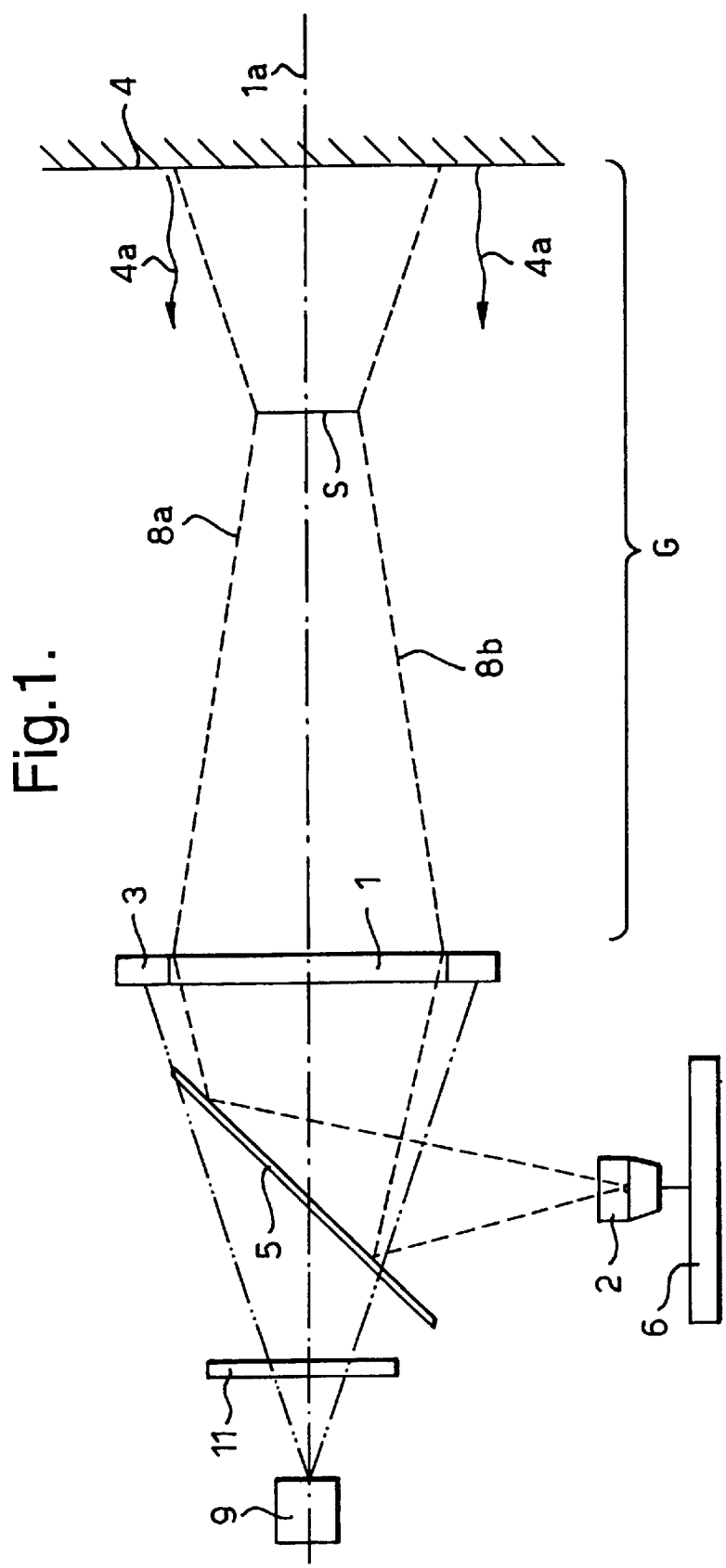
FIG. 1 shows a schematic basic representation of a device according to the invention.
Figure 4:
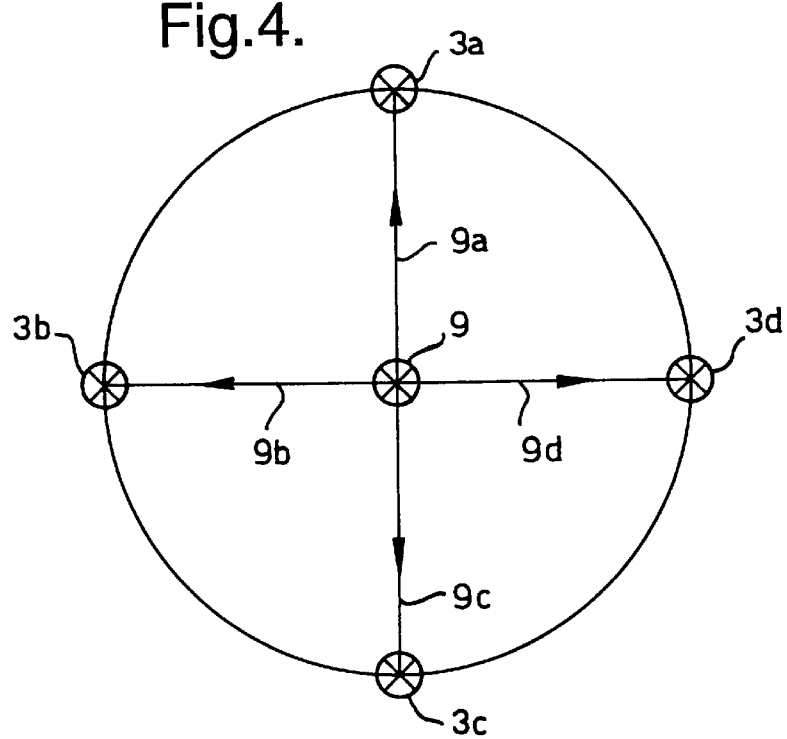
FIG. 4 shows a schematic representation of the light rays in the direction of the sighting arrangement.

FIG. 1 shows a basic representation of the device for contactless temperature measurement of an object. It consists essentially of an optical system I which images into the finite, a detector 2 and a sighting arrangement 3.

An object to be examined is designated by the reference numeral 4. The heat radiation emanating from this object 4 passes via the optical system 1 onto a deflecting mirror 5 which guides the radiation onto the detector 2. The heat radiation is converted into a voltage in the usual way in the detector 2 and is further processed in a subsequent arrangement 6.

The image of the detector 2 is imaged by way of the deflecting mirror 5 and the optical system 1 onto a circular measurement spot on the object 4. The diameter of the measurement spot then depends essentially upon the distance G between the optical system 1 and the object 4.

In an optical system which images into the finite, such as is used here, the image of the detector is imaged by the optical system along an optical axis 1a onto a measurement spot on the object 4 in such a way that the image of the detector reduces from the optical system to a sharp point measurement spot S and then enlarges, as is represented by the two dash-dot lines 8a, 8b.

Consequently the measurement spot on the object 4 would first of all diminish if its distance G from the optical system 1 is reduced. If this distance is further reduced after reaching the sharp point measurement spot S the measurement spot on the object 4 would enlarge again.

With the aid of the sighting arrangement 3 it is possible to render the measurement spot on the object 4 visible by a v sighting spot. The sighting spot corresponds essentially to the actual measurement spot irrespective of whether the object is disposed before, behind or in the sharp point measurement spot. The principle of this sighting arrangement 3 is explained in greater detail below with reference to FIGS. 2 to 6.

The sighting arrangement 3 represented in FIGS. 2 and 3 consists of four sighting elements 3a, 3b, 3c and 3d which are disposed concentrically around the optical system 1 at equal distances from one another. The sighting arrangement 3 is irradiated by a light source 9 on the side facing away from the object. The light rays 9a, 9b, 9c, 9d from the light source 9 which strike the individual sighting elements 3a, 3b, 3c, 3d are tilted by the sighting arrangement in such a way that the resulting sighting rays 10, 20, 30, 40 are aligned obliquely with respect to the optical axis 1a and, as can be seen from FIGS. 2 and 3, each light ray striking a sighting element is tilted in two planes perpendicular to one another to produce the sighting ray.

The angles of tilt in the two planes are adapted to the optical system 1 which images into the finite. For a better understanding the illustrated sighting arrangement only has four sighting elements 3a to 3d which are disposed in a circle and at equal distances from one another around the optical system 1. In the sharp point measurement spot, i.e., in the plane of intersection S-S, the sighting rays 10, 20, 30, and 40 produce four sighting points S1, S2, S3 and S4 which are in turn disposed equidistantly on a circle which identifies the sighting spot and corresponds in size to the measurement spot. However, each of the sighting spots is offset by 90° with respect to the sighting element which produces it.

Figure 5:
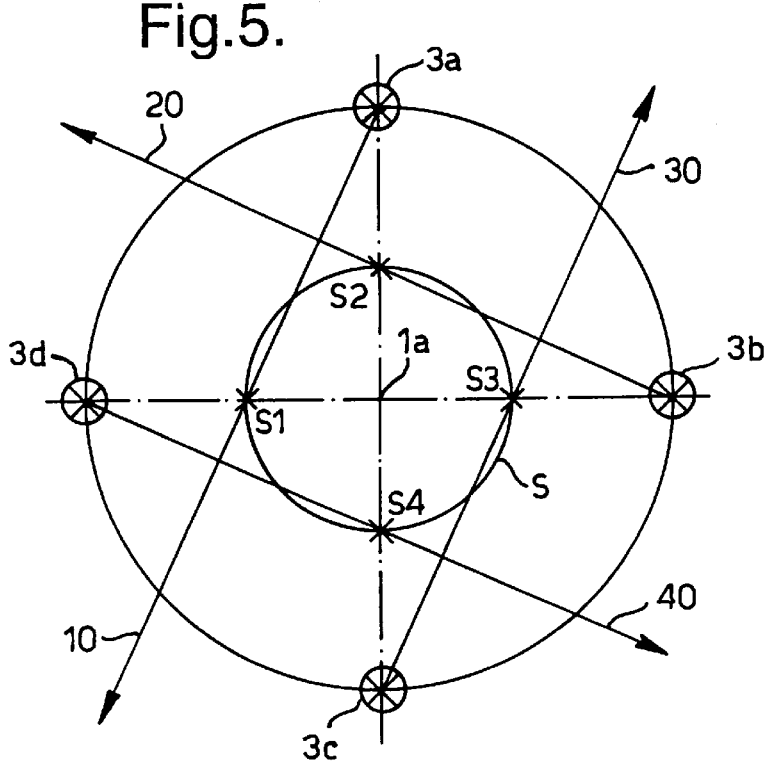
FIG. 5 shows a schematic representation of the sighting rays in the direction of the sighting arrangement.

This is particularly clear from the representation in FIG. 5, which shows a view in the direction of the optical axis 1a. In this case the sharp point measurement spot which is identified by the sighting points S1, S2 and S4 is designated by S. The ray 10 emanating from the upper sighting element 3a in turn produces a sighting point S4 on the lower end of the measurement spot S. Correspondingly, the right-hand and upper sighting points S3, S2 are also produced by the sighting elements 3C and 3b.

Figure 6:
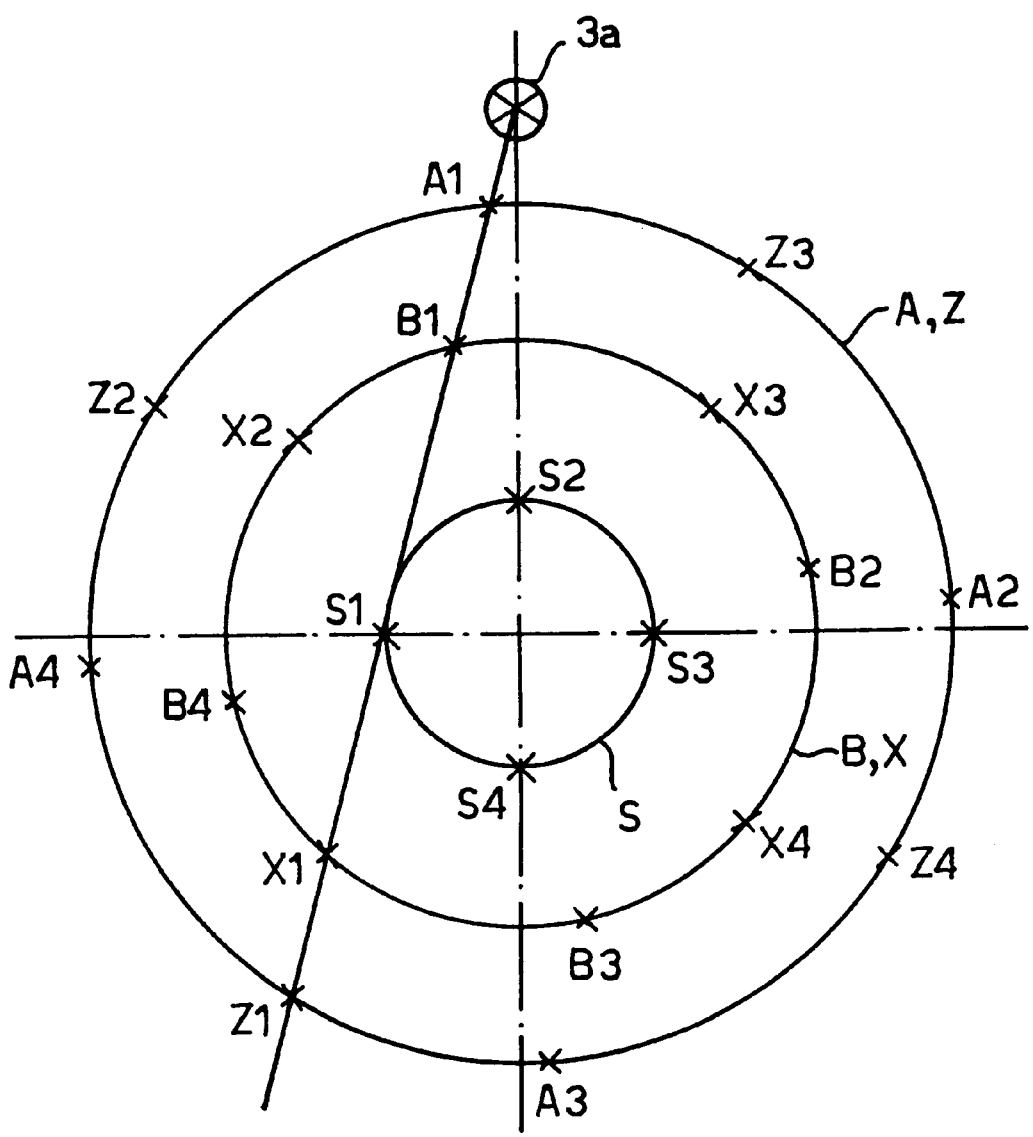
FIG. 6 shows a schematic representation of sighting spots in various planes of intersection according to FIG. 3

In FIG. 6 the sighting points are represented in five different planes of intersection according to FIG. 3. In each plane of intersection sighting points which identify the measurement spot in this plane are produced by the sighting rays. The various planes of intersection are disposed in such a way that the central plane of intersection S-S contains the sharp point measurement spot S and also in each case two planes of intersection are disposed before or after this plane. The measurement spots produced in the planes before the sharp point measurement spot have the same diameter as the measurement spots produced in the planes of intersection after the sharp point measurement spot.

If one first of all considers only the sighting ray 10 which is produced by the sighting element 3a, this ray intersects the various planes of intersection in the points A1, B1, S1, X1 and Z1. In a corresponding manner sighting points are in turn produced in the individual planes of intersection by the other sighting rays. The sighting points produced in sighting plane, for example the points A1, A2, A3 and A4 in the plane of intersection A—A identify the size of the measurement spot if the object were to be located at the same distance from the optical system 1. FIG. 6 also shows that the size of the measurement spot reduces starting from the measurement spot A in the plane of intersection A—A up to the sharp point measurement spot S and then enlarges again. The spacing of the planes of intersection was chosen so that the measurement spot A and the measurement spot Z or the measurement spot B and the measurement spot X each have the same Size.

Thus each individual sighting ray 10, 20, 30 and 40 can be used in each plane before or after the sharp point measurement spot to identify the measurement spot. Since the sighting rays are disposed not only obliquely with respect to the optical axis 1a but also obliquely with respect to one another there are no crossovers, so that all sighting points produced in a plane of intersection identify the measurement spot lying in this plane.

Naturally, within the scope of the invention it is also possible to use instead of four only two, but preferably at least eight sighting rays. When 16 sighting rays are used the circular measurement spot is represented very clearly by the individual sighting points.

In order to produce the oblique rays the sighting elements of the sighting arrangement 3 are advantageously constructed as prisms. The design of the individual prisms must be adapted to the optical system 1. Another possibility, which is not shown in greater detail, also consists for example of deflecting the sighting ray in the desired manner by reflection on two mirrors.

In the embodiment according to FIG. 7 the sighting—arrangement 3 is constructed as a prism ring with 16 individual prisms. This prism ring is disposed concentrically around the optical system 1. The sighting arrangement 3 also cooperates with the light source 9, the light rays from which strike the individual sighting elements. This can be achieved for example by the light source 9 irradiating a diffractive optical system 11 (see FIG. 1), particularly a hologram, the diffractive optical system being constructed in such a way that a number of rays corresponding to the number of sighting elements is produced, these rays being aligned with the sighting elements. However, it would also be conceivable to direct an individual ray consecutively onto the individual sighting elements by way of a rotating deflecting arrangement. Naturally, each individual sighting element could also co-operate with an associated light source, for example a laser diode.

The heat radiation 4a radiated from the object to be examined and represented by dash-dot lines in FIG. 7 passes by way of the deflecting mirror 5 to the detector 2. In the detector the heat radiation produces a voltage which is further processed in a manner which is known per se.

The device according to the invention is particularly simple to manipulate, since at each distance of the device from the object to be examined the measurement spot is clearly rendered visible with the aid of the sighting points. Thus the total light energy of the sighting rays is also used for representation of the measurement spot.

What is claimed is:

1. A system for contactless temperature measurement of an object with the system having an infrared optical system with a finite focal length and an infrared detector, wherein an image of the detector is imaged by the optical system along an optical axis onto a measurement spot on the object in such a way that the image of the detector reduces from the optical system to a sharp point measurement spot and then enlarges, and with a sighting arrangement which identifies the outer limit of the measurement spot at all distances from the optical system, said system comprising:
   a light source for outputting a primary light beam along an optical axis;
   a beamsplitter for splitting said primary light beam into first and second component beams;
   first and second sighting elements disposed away from the optical axis and disposed to respectively intersect said first and second component beams;
   with said first sighting element for deflecting the first component beam obliquely toward the optical axis in a first plane including the optical axis and deflecting the first component in a first direction perpendicular to first plane and away from the optical axis;

with said second sighting element for deflecting the first component beam obliquely toward the optical axis in a second plane including the optical axis and in a second direction perpendicular to said second plane away from the optical axis so that said first and second components intersect the limits of the measurement spot at all distances from the optical system.

2. The system as claimed in claim 1, wherein said beamsplitter is a hologram.

3. A laser sighting system for use in a radiometer including a an infrared (IR) radiation detector, an IR optical system which projects a projected image of the detector on a series of planes perpendicular to the optical axis and displaced along the optical axis with the size of the image being a minimum at finite focus point and being larger on planes disposed before and behind the finite focus point, said laser sighting system comprising:

a light source for outputting a primary light beam along an optical axis;

a beamsplitter for splitting said primary light beam into first and second component beams;

a plurality of sighting elements, each for obliquely deflecting a component beam to intersect the periphery of the projected image at each of a series of planes perpendicular to the optical axis and disposed along the optical axis at points of intersection of the image and for circumferentially deflecting the beams so that the point of intersection is rotated for images in different planes.

4. A system for contactless temperature measurement of an object with the device having an infrared optical system with a finite focal length and an infrared detector, wherein an image of the detector is imaged by the optical system along an optical axis onto a measurement spot on the object in such a way that the image of the detector reduces from the optical system to a sharp point measurement spot and then enlarges, and with a sighting arrangement which identifies the outer limit of the measurement spot at all distances from the optical system, said system comprising:

a light source for outputting a primary light beam along an optical axis;

a beamsplitter for splitting said primary light beam into first and second component beams;

first and second sighting elements disposed above and below the optical axis and substantially on a first plane including the optical axis and disposed to respectively intersect said first and second component beams;

with said first sighting element for deflecting the first component beam obliquely toward the optical axis in said first plane and in a first direction perpendicular to the first plane;

with said second sighting element for deflecting the first component beam obliquely toward the optical axis in said first plane and in a second direction perpendicular to said first plane so that said first and second components intersect the limits of the measurement spot at all distances from the optical system.

\* \* \* \* \*